US007021723B1

(12) United States Patent
Kaufman

(10) Patent No.: US 7,021,723 B1
(45) Date of Patent: Apr. 4, 2006

(54) OPERATING SYSTEM FOR TOWED VEHICLE ELECTRIC BRAKES

(76) Inventor: Thomas Neil Kaufman, 1514 Kanza, Hillsboro, KS (US) 67063

( * ) Notice: Subject to any disclaimer, the term of this patent is extended or adjusted under 35 U.S.C. 154(b) by 0 days.

(21) Appl. No.: 10/830,587

(22) Filed: Apr. 23, 2004

(51) Int. Cl.
*B60T 13/00* (2006.01)

(52) U.S. Cl. ............................................ 303/7; 303/20

(58) Field of Classification Search ................ 188/3 H, 188/3 R, 112 A, 112 R; 303/7, 123, 124
See application file for complete search history.

(56) References Cited

U.S. PATENT DOCUMENTS

| | | | | |
|---|---|---|---|---|
| 3,909,075 | A * | 9/1975 | Pittet et al. | 303/24.1 |
| 3,955,652 | A | 5/1976 | Nilsson et al. | |
| 4,325,052 | A * | 4/1982 | Koerner | 340/431 |
| 4,804,234 | A | 2/1989 | Gee et al. | |
| 5,295,736 | A | 3/1994 | Brearley | |
| 5,785,393 | A * | 7/1998 | McGrath et al. | 303/7 |
| 5,800,025 | A * | 9/1998 | McGrath et al. | 303/7 |
| 6,068,352 | A * | 5/2000 | Kulkarni et al. | 303/20 |
| 6,139,118 | A | 10/2000 | Hurst et al. | |
| 6,615,125 | B1 | 9/2003 | Eccleston et al. | |
| 6,619,759 | B1 * | 9/2003 | Bradsen et al. | 303/7 |
| 6,626,504 | B1 * | 9/2003 | Harner et al. | 303/7 |
| 6,655,752 | B1 * | 12/2003 | Robertson et al. | 303/20 |
| 2003/0038534 | A1 * | 2/2003 | Barnett | 303/7 |
| 2003/0168908 | A1 * | 9/2003 | Robinson et al. | 303/7 |
| 2003/0200016 | A1 * | 10/2003 | Spillane et al. | 701/36 |

* cited by examiner

*Primary Examiner*—Christopher P. Schwartz
(74) *Attorney, Agent, or Firm*—Jeffrey L. Thompson; Thompson & Thompson, P.A.

(57) ABSTRACT

An operating system for towed vehicle electric brakes where an electric signal proportional to the longitudinal force between a tow vehicle and a towed vehicle is used to create an output signal to actuate the brakes of the towed vehicle. The response of the output signal has a non-linear relationship to the difference between the instantaneous longitudinal force value and a target value. In the absence of a longitudinal force signal that fluctuates beyond a specified value from the target value, an alternative signal is created using predefined user values. A preferred embodiment includes a periodically increasing alternative signal with user settings for the rate of the periodic signal increase and for the maximum signal level.

23 Claims, 4 Drawing Sheets

OPERATING SYSTEM FOR TOWED VEHICLE ELECTRIC BRAKES

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of towing and more specifically to an operating system for towed vehicle electric brakes.

This invention represents an improved method of controlling electrically operated towed vehicle brakes. Electric towed vehicle brakes have been used for many years when medium sized vehicles are towed with light to medium duty vehicles such as light trucks and motor homes. Typically the tow vehicle is equipped with an electric towed vehicle brake controller that is mounted in the passenger compartment within sight and reach of the driver. The concept of the electric towed vehicle brake controller is to provide an electric signal that actuates the towed vehicle brakes causing them to create a retarding force that works in unison with the brake system of the towing vehicle. Currently marketed brake controllers can be grouped into one of three methods of operation; time based, acceleration based, or hydraulic pressure based. Time based units are the simplest. Upon initiation of braking, these units create a periodic increasing brake control signal which rises to a maximum level. The rate of signal increase and maximum signal level are set by the user prior to braking initiation. Acceleration based units create a brake control signal that is proportional to the deceleration rate of the tow vehicle—towed vehicle combination. Typically these units have user-set parameters for the orientation of the acceleration sensing device and the maximum signal level. The maximum signal level parameter also controls the proportionality constant of the controller output. Hydraulic pressure based units sense the hydraulic pressure in the brake system of the tow vehicle and create a brake control signal that is proportional to this pressure. These units usually have a user-set parameter of the maximum signal level which also controls the proportionality constant of the controller output.

Some have attempted to use the longitudinal force between the tow vehicle and towed vehicle to control electric towed vehicle brakes. These prior attempts have created a brake control signal that had a linear relationship to the longitudinal force. Because electric brake torque is not a linear function of applied power, the response of these systems can create undesirable tow vehicle-towed vehicle brake balance. Additionally, these units could not produce any brake control signal if the towed vehicle was not connected to the longitudinal force sensing hitch mechanism. Currently, several general hitch configurations are available such as fifthwheel, gooseneck, receiver type, and bumper/drawbar configurations. A towed vehicle connected to a hitch configuration that did not contain a longitudinal force sensor would not receive a brake control signal.

All currently marketed electric brake controllers require the user to set parameters for proper operation. For optimum tow vehicle-towed vehicle combined brake performance, these parameters need to be changed when towing conditions change, such as; changing to a different towed vehicle, a change in towed vehicle load, a change in general driving speeds, a change in towed vehicle brake temperatures or when the towed vehicle brakes become wet, and many other changes in towing conditions. Thus it is difficult to get and keep current brake controllers properly adjusted. All current brake controllers provide instructions to assist the user in setting the various parameters. However, this process can be difficult, time consuming, and involves putting the tow vehicle-towed vehicle combination into motion. All of these issues represent potential safety hazards. Driving a tow vehicle-towed vehicle combination with an electric brake controller that is not adjusted to optimum settings increases stopping distances and can put excessive energy into one of the vehicle service brake systems.

Time based brake controllers require two user set parameters. The maximum signal level parameter functions as the proportionality constant between the tow vehicle and the towed vehicle brake characteristics. The rate of increase parameter represents a very simplistic method of brake modulation. Because these parameters are set prior to the initiation of the braking event, these brake controllers do not react to differences in braking demand from one braking event to the next, or within a single braking event.

Without user intervention, these controllers create the same response even though one braking event may be a panic brake to avoid an obstacle in the road and the next braking event may only require a slight reduction in speed. The parameters dictate the progress of the braking event. Some users attempt to change these parameters during the braking event, this is a safety hazard as it detracts the driver's attention from operating the tow vehicle.

Acceleration based controllers also require two user set parameters. The maximum signal level parameter functions as the proportionality constant between the tow vehicle and the towed vehicle brake characteristics. The acceleration sensor orientation adjustment changes the relationship between the sensed vehicle acceleration and gravity. This process attempts to create a favorable modulation of the towed vehicle brake effort. Because the tow vehicle—towed vehicle unit is essentially rigidly coupled in a longitudinal sense, both tow vehicle braking effort and towed vehicle braking effort affect sensed longitudinal acceleration. These controllers cannot determine the relative contribution of the towed vehicle brakes to the combined vehicle braking effort. Thus modulation is a delicate balance that is difficult to maintain when the tow vehicle orientation relative to gravity changes or other towing conditions change.

Hydraulic pressure based controllers require the user to set the maximum signal level. The maximum signal level parameter functions as the proportionality constant between the tow vehicle and the towed vehicle brake characteristics. The control of the towed vehicle brake modulation is based on the tow vehicle hydraulic fluid pressure. Changes in tow vehicle brake temperature and surface friction conditions (example, wet brake surfaces) require a change to the proportionality constant to maintain balance between tow vehicle and towed vehicle brake efforts. Also a change in the towed vehicle brake characteristics (such as changing towed vehicles, changing towed vehicle load, etc.) requires a change in the proportionality constant. Additionally, the installation of these types of controllers requires modification of the tow vehicle hydraulic brake system. This is undesirable from a time and liability standpoint.

BRIEF SUMMARY OF THE INVENTION

The primary object of the invention is to provide optimized control of electric towed vehicle brakes without user adjustment when a towed vehicle is connected to a hitch which contains a longitudinal force sensor.

Another object of the invention is to automatically provide alternative control of electric towed vehicle brakes when the towed vehicle is connected to a hitch that does not contain a longitudinal force sensor.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed an operating system for towed vehicle electric brakes comprising: a means of creating an electric signal proportional to the longitudinal force between a tow vehicle and a towed vehicle, a means of monitoring the said longitudinal force electric signal, a means of monitoring the brake light circuit voltage of the tow vehicle, a means of creating an output voltage used to actuate the brakes of the towed vehicle, and a means of controlling said output voltage that is responsive to the longitudinal force electric signal when the brake light circuit voltage is above a specified value, and a further means of controlling the output voltage with an alternative signal in the absence of a longitudinal force signal that fluctuates beyond a specified value from a target value.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The present invention relates to an operating system for towed vehicle electric brakes adapted to regulate the towed vehicle brakes in response to changes in the longitudinal force occurring at the coupling between the tow vehicle and the towed vehicle. In the event the towed vehicle is connected to the tow vehicle at a point that does not sense the longitudinal force, the operating system automatically identifies this condition and provides towed vehicle brake control based on alternative information. The system includes provisions for the user to set variables which control the output signal in this case. The system also includes a user manual override input.

Figure 1:
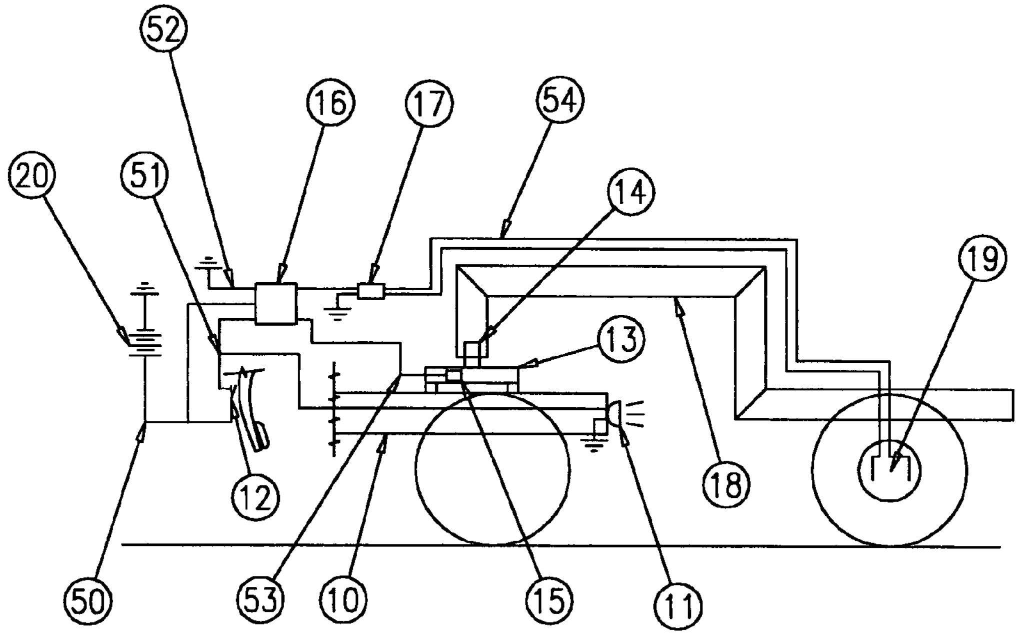
FIG. 1 is a schematic diagram illustrating the configuration of the invention.

As shown in FIG. 1 the towed vehicle electric brake controller 16 is preferably located on the tow vehicle. The towed vehicle electric brake controller connects to the tow vehicle 12 volt power supply circuit 50, ground circuit 52, brake lamp circuit 51, and the towed vehicle electric brake control circuit 54. The towed vehicle electric brake control circuit 54 is connected, through the tow vehicle/towed vehicle electrical connector 17, to the towed vehicle electric brake load 19 which actuates the brakes of the towed vehicle. The tow vehicle brake lamp circuit 51 is used to illuminate the tow vehicle stop lamps 11 whenever a service braking system is applied. The brake lamp circuit 51 is attached to the tow vehicle electrical system such that this circuit is only energized when the brake lamp switch 12 is closed. Power for the light and electrical systems is drawn from the tow vehicle 12 volt power source 20. The towed vehicle electric brake controller 16 also connects to the longitudinal force sensor 15 through the longitudinal force sensor circuit 53.

Figure 3:
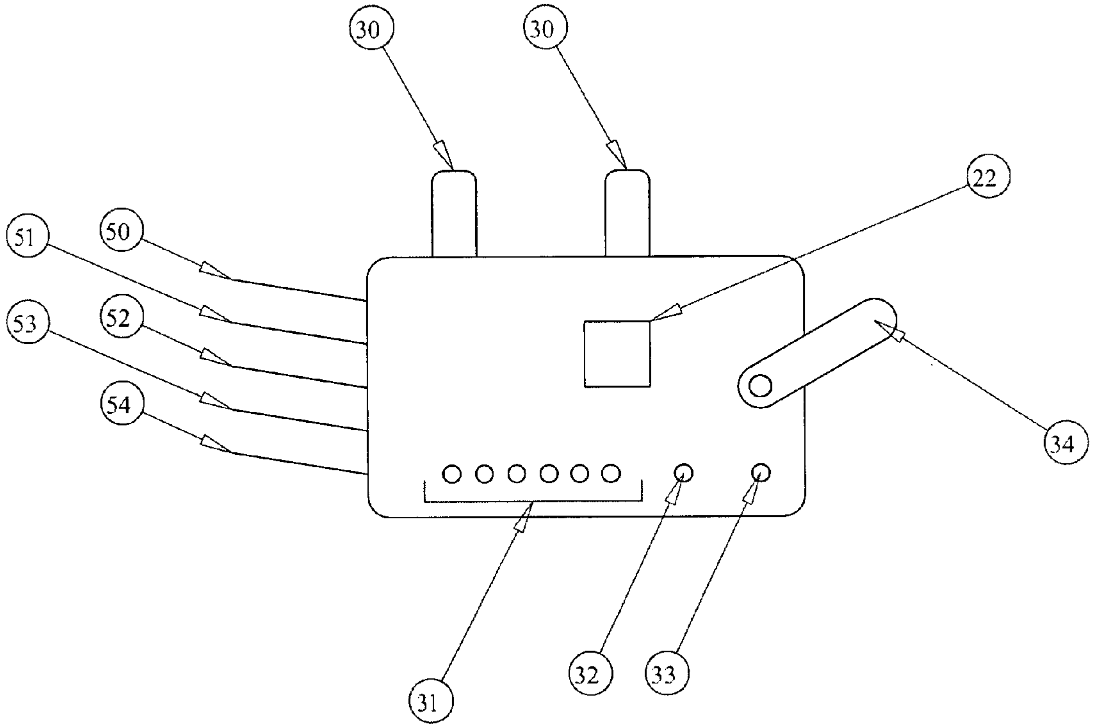
FIG. 3 is a diagram of a possible embodiment of the towed vehicle electric brake controller housing.

FIG. 3 shows the typical inputs and outputs for the towed vehicle electric brake controller 16. In addition to the circuit connections described previously, the user provides input and receives output from the towed vehicle electric brake controller. Knobs 30 connected to potentiometers are provided for the user to set variables to define the characteristics of the alternative information used to create the brake output control signal. In one embodiment a knob would set the rate of periodic increase and another knob would set the maximum signal level achieved when the towed vehicle electric brake controller is creating a brake output control signal based on the alternative information. A lever 34 is provided for the user to actuate and thus override any of the automatic control schemes. Actuation of the lever 34 causes the brake output control signal to be proportional to the lever displacement. An indicating means, such as a light emitting diode, is provided to inform the user of the status of several operating parameters. In one embodiment, a power LED 33 indicates the presence of 12 volt power at the power supply circuit 50. Another LED 32 indicates continuity of the towed vehicle electric brake control circuit 54 to ground 52. Additional LEDs 31 are sequentially illuminated to indicate the relative level of the towed vehicle electric brake control circuit 54 with respect to ground.

A longitudinal force sensor circuit 53 connects the longitudinal force sensor 15 to the towed vehicle electric brake controller 16. The longitudinal force sensor 15 is integrated in the tow vehicle hitch structure 13 that connects the tow vehicle coupling 14 to the tow vehicle frame 10. The longitudinal force sensor 15 creates an electric signal that is proportional to the instantaneous longitudinal force applied by the towed vehicle structure 18 to the coupling 14. The longitudinal force sensor 15 may consist of a commonly available load cell force transducer so positioned in the hitch structure that a longitudinal force applied to the coupling is resisted through the load cell.

Figure 4:
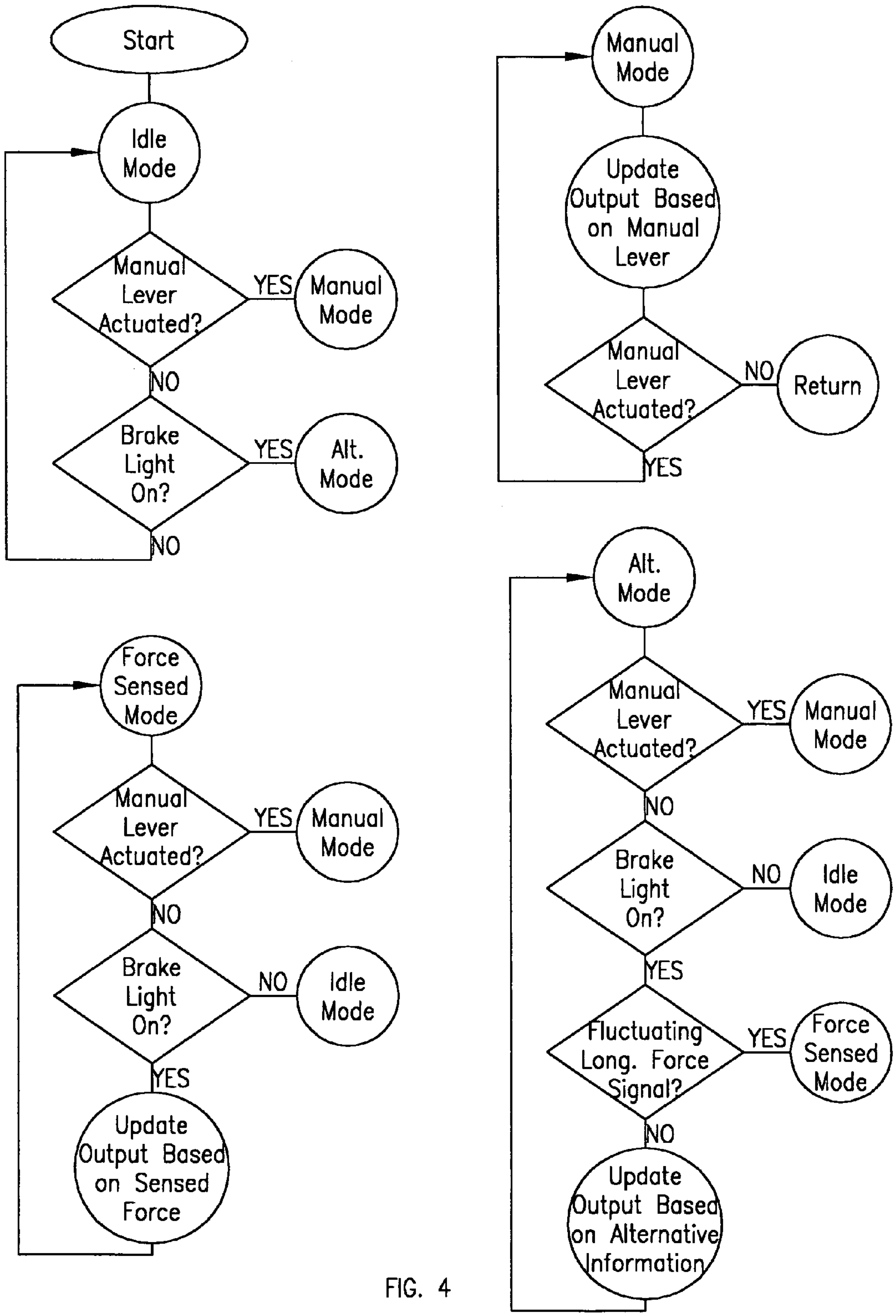
FIG. 4 is a flowchart depicting the modes and steps implemented in the towed vehicle electric brake controller.

In the towed vehicle electric brake controller 16 the longitudinal force signal is electronically amplified and filtered to remove the high frequency content. This signal is connected to an analog input of a microprocessor. FIG. 4 depicts a flowchart that computer code in the microprocessor implements. The computer code can have subroutines that are described as modes in the flowchart. The towed vehicle electric brake controller 16 remains in idle mode until either the manual lever is actuated or the tow vehicle brake light circuit voltage exceeds a value such as 2 volts.

If the manual lever 34 is actuated, the microprocessor recognizes this and control transfers to the manual mode flowchart. Manual mode has priority over all other modes. In manual mode, the microprocessor generates a brake output control signal that is proportional to the manual lever actuation.

While in idle mode, if the brake lamp circuit 51 voltage exceeds a threshold value, control is transferred to alternative mode. In one embodiment, the brake output control signal is controlled in the alternative mode to be a periodic increasing signal that changes at a rate set by a user input knob 30 to a maximum signal level also set by a user input knob 30. In another embodiment, the brake output control signal in the alternative mode is controlled by an output from a longitudinal acceleration sensor 22. Alternative mode has the lowest priority. While in alternative mode the signal from the longitudinal force sensor circuit 53 is monitored for voltage changes in excess of a specified value. If a sufficient change is detected, control is transferred to the force-sensed mode.

Figure 5:
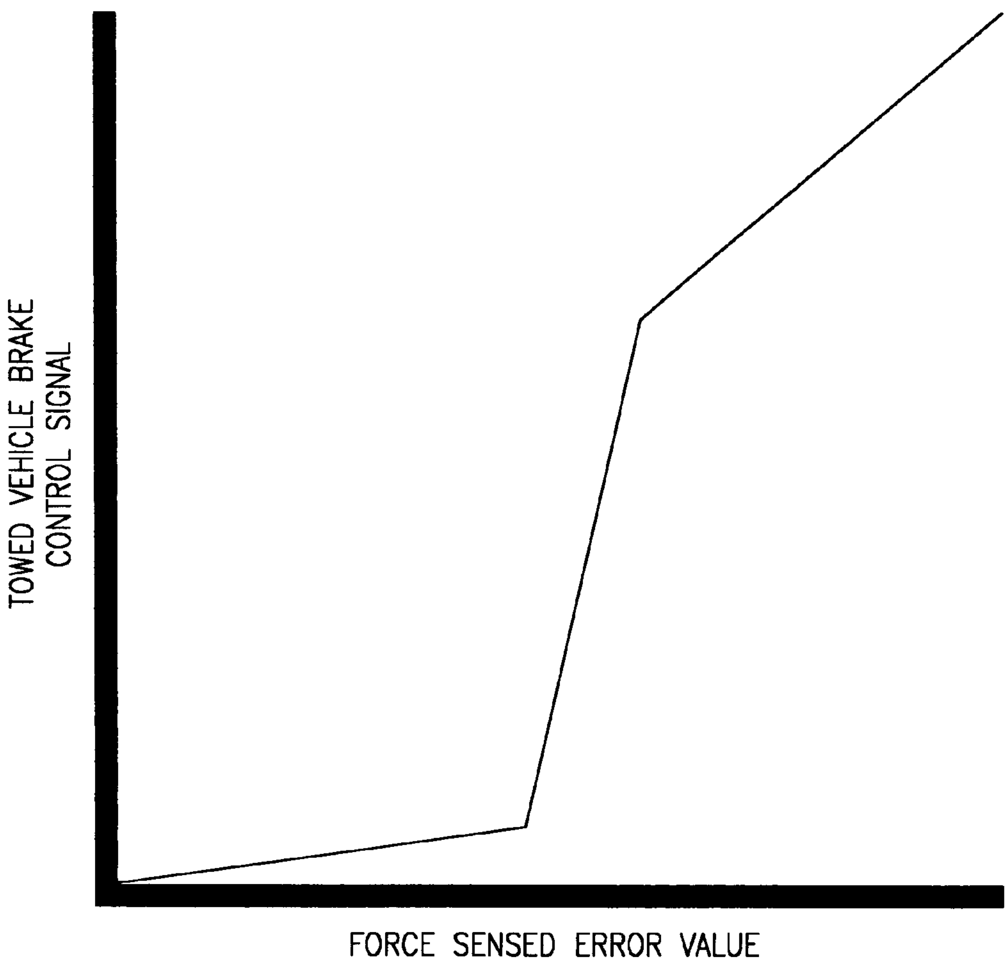
FIG. 5 is a chart that visually represents a record that determines the ratio of brake control output voltage relative to the difference in the longitudinal force electric signal from a target value.

In one embodiment, the force sensed mode brake output control signal level is non-linear proportional to the error (the difference between the instantaneous longitudinal force sensor signal value and a target value). In this embodiment, the relationship between the longitudinal force sensor input 53 and the towed vehicle brake control output signal 54 is a non-linear relationship that can be represented as a piecewise curve having linear segments possessing different slopes for each segment as shown in FIG. 5. The actual slope relationships used are dependent on the input amplifier gain and output signal level required. The controller 16 can also control the output signal 54 based on the instantaneous difference in the longitudinal force electric signal from a target value, the difference in the longitudinal force electric signal from the target value accumulated over time, and the rate of change over time of the difference in the longitudinal force electric signal from the target value.

While in alternative mode or force sensed mode, the position of the manual lever 34 and the voltage level of the tow vehicle brake light circuit 51 is monitored. If the manual lever 34 is actuated, control is passed to manual mode. When lever actuation ceases, control is passed back to the mode which was active prior to manual mode. If during alternative or force sensed modes the tow vehicle brake light voltage drops below the specified value, control is passed to idle mode.

It is customary in towed vehicle electric brake controllers for the output to the towed vehicle brakes to be generated as a pulse width modulated signal controlled by a transistor. In this case the brake output control signal generated above is a pulse width duty cycle.

Figure 2:
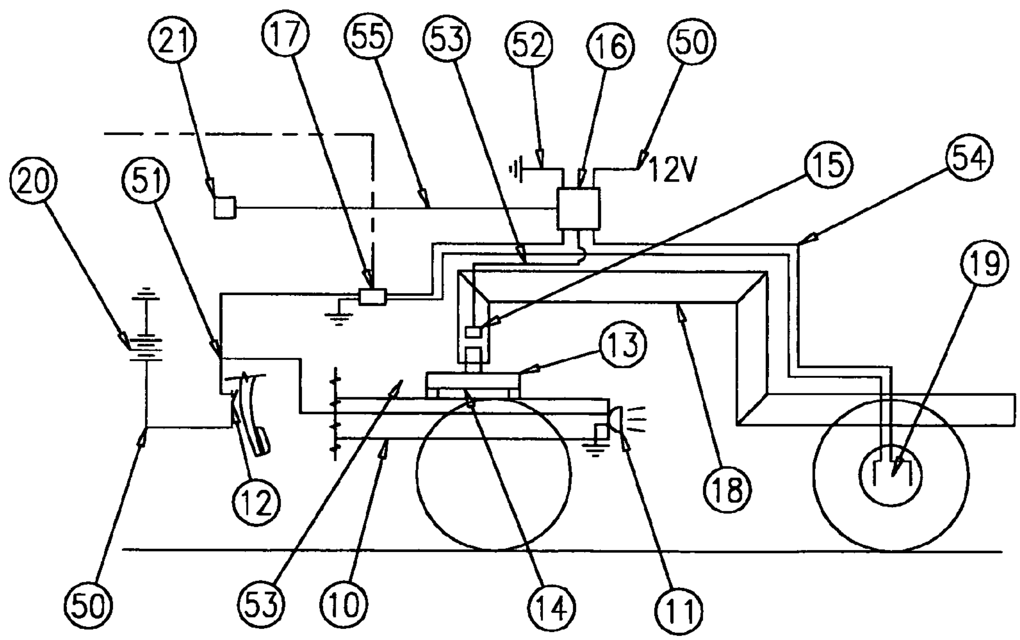
FIG. 2 is a schematic diagram illustrating an alternative configuration of the invention.

An alternative embodiment is presented in FIG. 2. Here the longitudinal force sensor 15 and towed vehicle electric brake controller 16 are located on the towed vehicle. In this case a separated user interface housing 21 is located in the tow vehicle. The separated user interface housing 21 communicates with the towed vehicle electric brake controller 16 through a separated user interface circuit 55 which may be a wireless communication system.

The descriptions of the invention disclosed herein are only the preferred embodiments. The embodiments shown in the figures are for illustrative purposes only and are not intended to limit the scope of this invention. This invention is defined by the following claims and I intend all changes or modifications within the range and meaning of equivalents to be embraced by these claims.

What is claimed:

1. An operating system for towed vehicle electric brakes comprising:

a means of creating a longitudinal force electric signal proportional to a longitudinal force between a tow vehicle and a towed vehicle;

a means of monitoring a brake activation condition of the tow vehicle;

a first automatic brake control mode in which an output voltage is created in response to said longitudinal force electric signal and said brake activation condition for actuating the electric brakes of the towed vehicle;

a second automatic brake control mode in which the output voltage is created based on alternative information other than said longitudinal force electric signal; and a means for changing between the first and second automatic brake control modes based on a determination of whether the longitudinal force electric signal fluctuates beyond a specified value from a target value, whereby the first automatic brake control mode is used when the longitudinal force electric signal fluctuates beyond said specified value, and the second automatic brake control mode is used when the longitudinal force electric signal does not fluctuate beyond said specified value.

2. An operating system for towed vehicle electric brakes as claimed in claim 1, wherein said means of controlling the output voltage that is responsive to the longitudinal force electric signal comprises a non-linear relationship which determines the ratio of output voltage relative to the difference in the longitudinal force electric signal from a target value.

3. An operating system for towed vehicle electric brakes as claimed in claim 2, wherein said alternative signal comprises a signal that periodically increases to a maximum signal level.

4. An operating system for towed vehicle electric brakes as claimed in claim 3, further comprising a means for the user to adjust a rate of periodic signal increase of the alternative signal; and a means for the user to adjust the maximum signal level.

5. An operating system for towed vehicle electric brakes as claimed in claim 2, wherein said alternative signal comprises an output from a longitudinal acceleration sensor.

6. An operating system for towed vehicle electric brakes as claimed in claim 2, wherein said non-linear relationship corresponds to a curve comprising a plurality of linear segments having different slopes.

7. An operating system for towed vehicle electric brakes as claimed in claim 1, wherein said means of controlling the output voltage that is responsive to the longitudinal force electric signal controls the output voltage based on an instantaneous difference in the longitudinal force electric signal from a target value, a difference in the longitudinal force electric signal from the target value accumulated over time, and a rate of change over time of the difference in the longitudinal force electric signal from the target value.

8. An operating system for towed vehicle electric brakes as claimed in claim 7, wherein said alternative signal comprises a signal that periodically increases to a maximum signal level.

9. An operating system for towed vehicle electric brakes as claimed in claim 8, further comprising a means for the user to adjust a rate of periodic signal increase of the alternative signal; and a means for the user to adjust the maximum signal level.

10. An operating system for towed vehicle electric brakes as claimed in claim 7, wherein said alternative signal comprises an output from a longitudinal acceleration sensor.

11. An operating system for towed vehicle electric brakes as claimed in claim 1, wherein said alternative signal comprises a signal that periodically increases to a maximum signal level.

12. An operating system for towed vehicle electric brakes as claimed in claim 11, further comprising a means for the user to adjust a rate of periodic signal increase of the alternative signal; and a means for the user to adjust the maximum signal level.

13. An operating system for towed vehicle electric brakes as claimed in claim 1, wherein said alternative signal comprises an output from a longitudinal acceleration sensor.

14. An operating system for towed vehicle electric brakes, comprising:

a longitudinal force sensor for generating a longitudinal force electric signal proportional to a longitudinal force between a tow vehicle and a towed vehicle; and a towed vehicle brake controller having an output for operating a towed vehicle electric brake system, said brake controller comprising a controlling means for controlling an output voltage of said output based on a non-linear relationship between the output voltage and the longitudinal force electric signal, wherein said non-linear relationship determines a ratio of output voltage relative to the difference in the longitudinal force electric signal from a target value.

15. The operating system according to claim 14, wherein said brake controller further comprises an alternative means for controlling all output voltage of said output using an alternative signal when a longitudinal force electric signal that fluctuates beyond a specified value from a target value is not received by the brake controller.

16. The operating system according to claim 15, wherein said alternative signal comprises a signal that periodically increases to a maximum signal level.

17. The operating system according to claim 15, wherein said alternative means for controlling comprises a longitudinal acceleration sensor and a means for controlling an output voltage of said output based on a signal generated by said longitudinal acceleration sensor.

18. The operating system according to claim 14, wherein said brake controller further comprises an input for connecting to a brake light circuit of the tow vehicle, and a means for activating said controlling means when an input voltage at said input is above a specified value.

19. The operating system according to claim 14, wherein said non-linear relationship corresponds to a curve comprising a plurality of linear segments having different slopes.

20. The operating system according to claim 14, wherein said controlling means controls the output voltage based on an instantaneous difference in the longitudinal force electric signal from a target value, a difference in the longitudinal force electric signal from the target value accumulated over time, and a rate of change over time of the difference in the longitudinal force electric signal from the target value.

21. An operating system for towed vehicle electric brakes as comprising:

a means of creating a longitudinal force electric signal proportional to a longitudinal force between a tow vehicle and a towed vehicle;

a means of monitoring the said longitudinal force electric signal;

a means of monitoring the brake light circuit voltage of the tow vehicle;

a means of creating an output voltage used to actuate the brakes of the towed vehicle; and a means of controlling said output voltage that is responsive to the longitudinal force electric signal when the brake light circuit voltage is above a specified value, said means of controlling the output voltage providing a non-linear relationship between said output voltage and said longitudinal force electric signal;

wherein said non-linear relationship determines the ratio of output voltage relative to the difference in the longitudinal force electric signal from a target value.

22. An operating system for towed vehicle electric brakes as claimed in claim 21, wherein said non-linear relationship corresponds to a curve comprising a plurality of linear segments having different slopes.

23. An operating system for towed vehicle electric brakes comprising:

a means of creating a longitudinal force electric signal proportional to a longitudinal force between a tow vehicle and a towed vehicle;

a means of monitoring the said longitudinal force electric signal;

a means of monitoring the brake light circuit voltage of the tow vehicle;

a means of creating an output voltage used to actuate the brakes of the towed vehicle; and a means of controlling said output voltage that is responsive to the longitudinal force electric signal when the brake light circuit voltage is above a specified value, said means of controlling the output voltage providing a non-linear relationship between said output voltage and said longitudinal force electric signal;

wherein said means of controlling the output voltage controls the output voltage based on an instantaneous difference in the longitudinal force electric signal from a target value, a difference in the longitudinal force electric signal from the target value accumulated over time, and a rate of change over time of the difference in the longitudinal force electric signal from the target value.

* * * * *